UNITED STATES PATENT OFFICE.

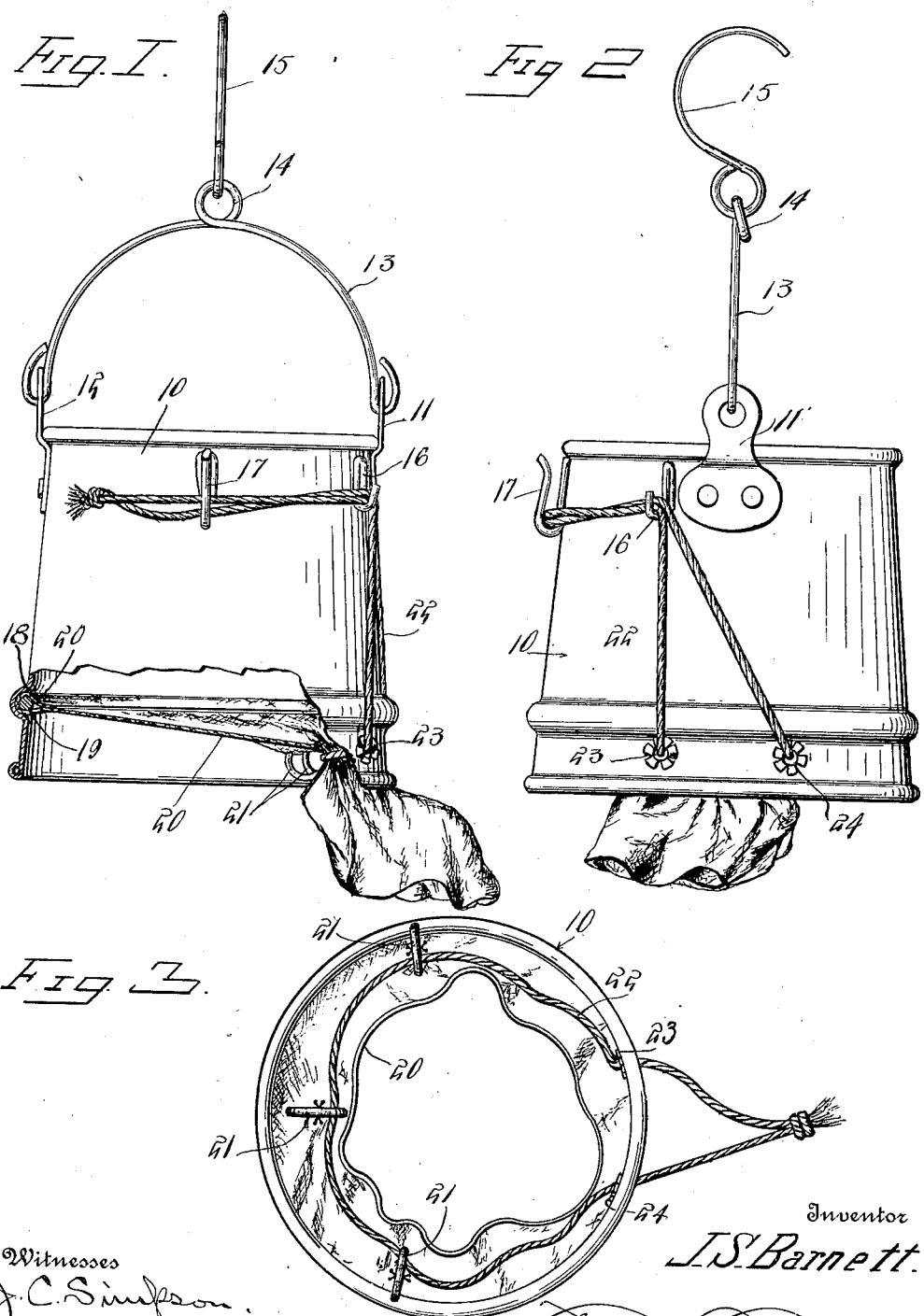

JOHN S. BARNETT, OF CENTRAL POINT, OREGON.

FRUIT-PICKER'S RECEPTACLE.

1,029,581.  Specification of Letters Patent.  Patented June 18, 1912.

Application filed September 18, 1911. Serial No. 649,834.

*To all whom it may concern:*

Be it known that I, JOHN S. BARNETT, a citizen of the United States, residing at Central Point, in the county of Jackson, State of Oregon, have invented certain new and useful Improvements in Fruit-Pickers' Receptacles; and I do hereby declare the following to be a full, clear, and exact description of the invention, such as will enable others skilled in the art to which it appertains to make and use the same.

This invention relates to fruit pickers' receptacles.

The object of the invention resides in the provision of a fruit picker's receptacle which will effectually protect the fruit from injury while being gathered and when being discharged into a shipping crate or upon an assorting table as the case may be.

A further object of the invention resides in so constructing the receptacle that the fruit contained therein will be positioned inwardly of the bottom of the receptacle and thereby protect it from injury by contact with tree limbs or when the receptacle is placed upon the ground or other support.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a side elevation of the receptacle, same being partly in section and showing the fabric bottom of the receptacle in closed position, Fig. 2, a side elevation of the receptacle viewed at right angles to Fig. 1, and Fig. 3, a bottom plan view of the receptacle with the fabric bottom in open position.

Referring to the drawings, the receptacle is shown as comprising a tubular member 10, preferably of sheet metal, said member being open at its ends and provided with ears 11 and 12 to receive a supporting bail 13, said supporting bail being constructed preferably of stout wire and being bent to form an eye 14 disposed centrally thereof. A hook 15 is secured in said eye so that the member 10 and other portions of the receptacle secured thereto may be detachably suspended from a ladder or other suitable support convenient to the hand of the person picking the fruit.

Secured to the outer side of the member 10 at spaced points are a supporting member 16 and spring clip 17 for a purpose that will presently appear. The member 10 is provided adjacent its lower end with an internally disposed circumferential groove 18 adapted to receive a resilient split ring 19, which latter is suitably secured in the upper end of a tubular fabric member 20; said split ring enabling the easy and ready attachment and detachment of the member 20 to and from the member 10.

The member 20 is provided at its lower end with a plurality of rings 21 spaced apart and likewise spaced above the extreme lower terminal of said member 20. A cord 22 is passed through the ring 21 and then through respective openings 23 and 24 formed in the tubular member 10 between its lower edge and the groove 18. After the cord is passed through the openings 23 and 24 the terminals thereof are connected together in a suitable manner. From this construction it will be apparent that if the cord 22 is pulled sharply through the openings 23 and 24 the lower end of the fabric member 20 will be closed into a compact mass, so that the bottom formed by the fabric member 20 is disposed above the lower edge of the member 10. This position of the fabric bottom will protect fruit from injury when the receptacle is placed upon the ground or other suitable supports. During the operation of picking the cord 22 is passed over the supporting member 16 and frictionally held by being interposed between the spring clip 17 and the member 10. When a sufficient quantity of fruit has been deposited in the receptacle it is only necessary in order to discharge same to detach the cord 22 from frictional engagement with the clip 17 and the member 10 when the weight of the fruit will open the lower end of the member 20 and allow it to pass gently into the desired crate or the like.

What is claimed is:

A fruit picker's receptacle comprising a rigid tubular member open at its ends and provided with a pair of openings in its wall, a tubular member of fabric material open at its ends and having its upper end detachably secured within the rigid tubular member in expanded position between said openings and the top of the tubular member, a plurality of rings secured to said fabric member near the lower end thereof and a draw cord extending through said rings and through the openings respectively in the rigid tubular member.

In testimony whereof, I affix my signature, in presence of two witnesses.

JOHN S. BARNETT.

Witnesses:
J. O. ISAACSON,
E. D. KAHLER.